(12) United States Patent
Zeolla et al.

(10) Patent No.: US 10,005,340 B2
(45) Date of Patent: Jun. 26, 2018

(54) FLUID COOLING APPARATUS

(75) Inventors: Giuseppe Zeolla, Minusio (CH); Ralf Schmitt, Tholey (DE)

(73) Assignee: HYDAC AG, Steinhausen (CH)

( * ) Notice: Subject to any disclaimer, the term of this patent is extended or adjusted under 35 U.S.C. 154(b) by 375 days.

(21) Appl. No.: 13/261,616

(22) PCT Filed: Aug. 12, 2011

(86) PCT No.: PCT/EP2011/004052
§ 371 (c)(1),
(2), (4) Date: May 10, 2013

(87) PCT Pub. No.: WO2012/034623
PCT Pub. Date: Mar. 22, 2012

(65) Prior Publication Data
US 2013/0220574 A1 Aug. 29, 2013

(30) Foreign Application Priority Data
Sep. 17, 2010 (DE) .................. 10 2010 045 795

(51) Int. Cl.
*B60H 3/00* (2006.01)
*B61D 27/00* (2006.01)
*F01P 11/20* (2006.01)
*B60H 1/32* (2006.01)
*B60K 11/00* (2006.01)
(Continued)

(52) U.S. Cl.
CPC ............... *B60H 1/32* (2013.01); *B60K 11/00* (2013.01); *B60K 11/04* (2013.01); *B60K 11/08* (2013.01)

(58) Field of Classification Search
CPC ... E02F 9/0883; B60H 1/00378; B60K 11/04; B62D 25/084

USPC .................. 165/41, 42, 43; 123/41.49
See application file for complete search history.

(56) References Cited

U.S. PATENT DOCUMENTS 1,081,023 A * 12/1913 Fevre .................. F01P 5/06
 123/41.49
1,192,218 A * 7/1916 Masury ................ B60K 11/04
 165/122
(Continued)

FOREIGN PATENT DOCUMENTS

DE 25 02 242 B2 8/1975
DE 11 2005 000 535 T5 1/2007
(Continued)

OTHER PUBLICATIONS

Translation of Japanese Patent Document JP 57133450 U entitled Translation-JP 57133450 U, translated Dec. 2015.*
Translation of German Patent Document DE 102008026200 A1 entitled Translation-DE 102008026200 A1, translated Apr. 2015.*

*Primary Examiner* — Len Tran
*Assistant Examiner* — Paul Alvare
(74) *Attorney, Agent, or Firm* — Wenderoth, Lind & Ponack, L.L.P.

(57) ABSTRACT

A fluid cooling apparatus (5) includes at least one heat exchanger device for cooling at least one working or cooling fluid heated or used during the operation of movable machines (1). The machine has an outer engine covering (11) to cover engine, motor or chassis parts and has a tank (9) containing the working and/or cooling fluid with a predeterminable wall outer contour (7). At least parts of the wall outer contour (7) are pan of the engine covering (11).

8 Claims, 4 Drawing Sheets

(51) Int. Cl.
*B60K 11/04* (2006.01)
*B60K 11/08* (2006.01)

(56) References Cited

U.S. PATENT DOCUMENTS

| | | | | |
|---|---|---|---|---|
| 1,311,528 | A | * | 7/1919 | Muir .......................... F01P 3/22 123/41.21 |
| 1,978,892 | A | * | 10/1934 | Bolkcom ................. B60H 1/08 123/142.5 R |
| 2,979,205 | A | | 4/1961 | Allin |
| 3,996,999 | A | | 12/1976 | Termont et al. |
| 4,771,844 | A | * | 9/1988 | Bassett ........................ 180/68.1 |
| 5,285,863 | A | * | 2/1994 | Miki ..................... B60K 11/06 180/68.2 |
| 6,179,043 | B1 | * | 1/2001 | Betz ................................ 165/41 |
| 6,871,697 | B2 | * | 3/2005 | Albright et al. ............. 180/68.1 |
| 6,929,739 | B2 | * | 8/2005 | Pohl et al. ...................... 210/90 |
| 2005/0077062 | A1 | * | 4/2005 | Fukazawa et al. ........... 172/776 |
| 2008/0023174 | A1 | * | 1/2008 | Nakae et al. ................... 165/42 |
| 2008/0135209 | A1 | * | 6/2008 | Lowe et al. ..................... 165/77 |

FOREIGN PATENT DOCUMENTS

| | | | |
|---|---|---|---|
| DE | 10 2008 026 200 A1 | 12/2009 | |
| DE | 10 2008 027 424 A1 | 12/2009 | |
| DE | 102008026200 A1 * | 12/2009 | ............... F01P 3/18 |
| EP | 2 426 277 | 3/2012 | |
| JP | 57133450 U * | 8/1982 | |

* cited by examiner

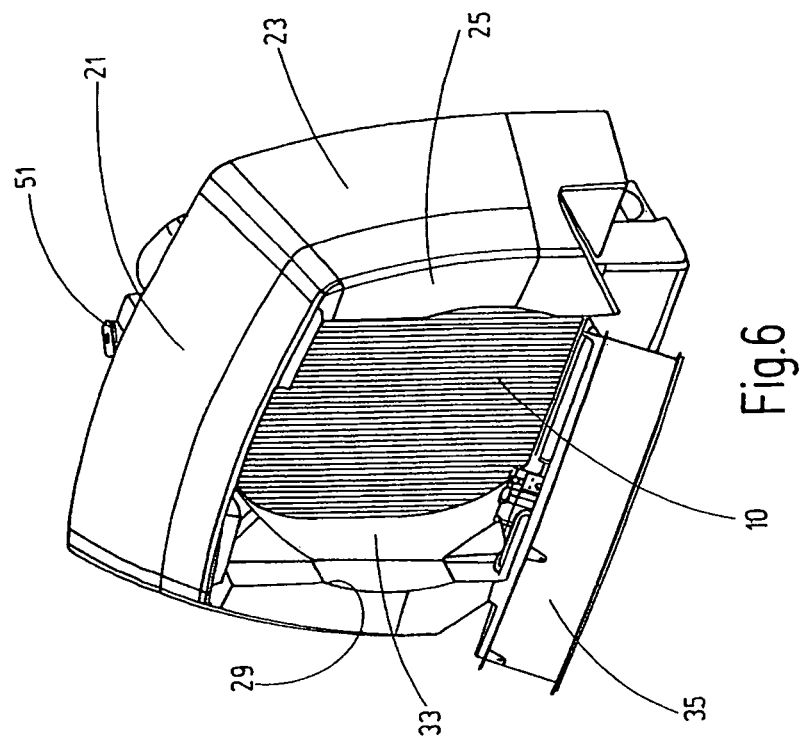
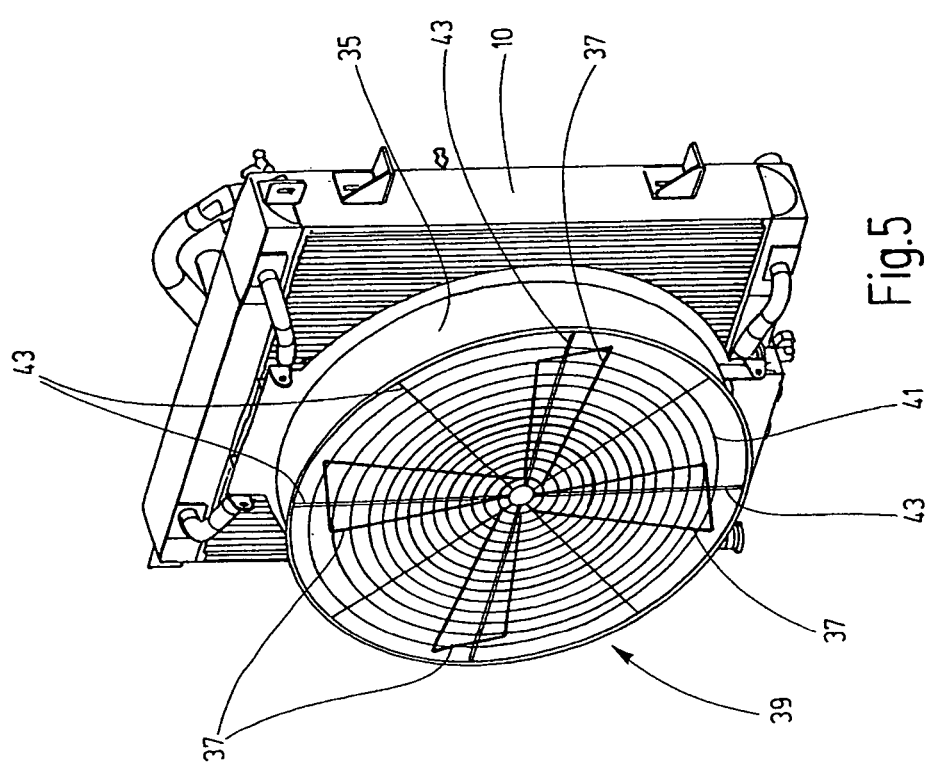

FLUID COOLING APPARATUS

FIELD OF THE INVENTION

The invention relates to a fluid cooling apparatus comprising at least one heat exchanger unit for cooling at least one working or cooling fluid heated or used during the operation of mobile working machines having an engine covering to cover the engine, motor, or chassis parts, and, furthermore, comprising a tank that contains the working and/or cooling fluid and has a predeterminable outer wall contour.

BACKGROUND OF THE INVENTION

Cooling devices for working or cooling fluids can be used for a plurality of applications and are readily available in a variety of embodiments on the market. One important area of application of such cooling devices is the use in working machines with a hydraulic system. For example, it can be an open fluid circuit, for example, in the form of working hydraulics or as a closed hydrostatic drive, for example, in the form of a travel drive. For example, DE 10 2008 027 424 A1 discloses a fluid cooling apparatus for hydraulic oil that serves as the working fluid for the hydrostatic drive of a mobile working machine.

The installation of cooling devices inside the covering creates for working machines not only a spatial problem due to the available installation space, but also thermal problems. Even though the available installation space is typically extremely limited, an adequate and safe removal of the heat dissipated by the heat exchanger unit must be guaranteed. As a result, customarily partitions are installed, which partitions form a seal relative to the respective covering to prevent the cooling air, which is heated inside the covering, from being sucked in and flowing back again to the cooling primary air stream. However, such seals have been demonstrated to fail due to vibrations and shocks during the rough operation of mobile working machines and, hence, create thermal problems.

SUMMARY OF THE INVENTION

An object of the present invention is to provide an improved fluid cooling apparatus of the type under consideration in such a way that it is better able to satisfy the requirements to be applied to mobile working machines during operational use.

The invention basically achieves this object by a fluid cooling apparatus having at least parts of the outer wall contour of the tank being a component of the engine covering.

Since the tank is a component of the engine covering and the pertinent tank surface is not located under the covering and is exposed to the environment, the tank itself contributes to the improved removal of heat. Since it is possible to dispense with that part of the covering that is taken over by the tank itself, the result is additionally a reduction in the structural weight.

The arrangement can be configured in such an advantageous way that those parts of the outer wall contour of the tank that face the surrounding area merge with the outer engine covering along a connecting point or line as a component of the outer engine covering. As a result, the tank itself can form a connecting point of the outer chassis of the working machine, for example, in the form of a front or rear section that merges with an engine compartment hood at the connecting point.

In this context, the connecting point with a distinct advantage can produce seamlessly the continuous transition between the pertinent outer engine covering, for example, in the form of the engine compartment hood, and the outer wall contour of the tank.

If, at the same time, a gasket, which extends in the shape of a line, is arranged between the outer engine covering, for example, the hood, and the outer wall contour of the tank along the connecting point, then there is the distinct advantage that the tank itself performs the function of a partition that eliminates the risk of being able to suck in its own heated air when in operation.

In view of an especially compact design, advantageously the tank has an integrated receiving channel for receiving a filter unit in the peripheral region of the tank housing, and the tank has a fan device in the region of the tank's face side facing the surrounding area outside the vehicle. This fan device is also integrated with its fan cover into the outer engine covering as a component of the outer engine covering.

To form an especially compact unit, the tank can be provided with a continuous central recess inside the tank housing. The fan blades are driven inside this central recess.

If, in this case, the heat exchanger unit is connected to the tank housing in the manner of an air fin cooler on the side opposite the fan device or is an integral component of the tank housing, then the entire system of the fluid cooling apparatus forms a combined structural unit that requires only a small amount of installation space in the working machine.

The filter device that belongs to the fluid cooling apparatus can have, in an especially advantageous way, valve units that include, for example, a precharge valve, a replenishing valve, or a bypass valve. An uninterrupted supply of fluid, of which the temperature is controlled in a suitable way by the cooling device, to the pertinent consumer is guaranteed.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIG. 5 is a perspective view of just the heat exchanger unit and adjacent thereto the fan device of the fluid cooling apparatus of FIG. 1; and FIG. 6 is a perspective view, viewed in the direction of the front side of the fluid cooling apparatus of FIG. 1, with the fan device shown in the folded down state.

DETAILED DESCRIPTION OF THE INVENTION

Figure 1:
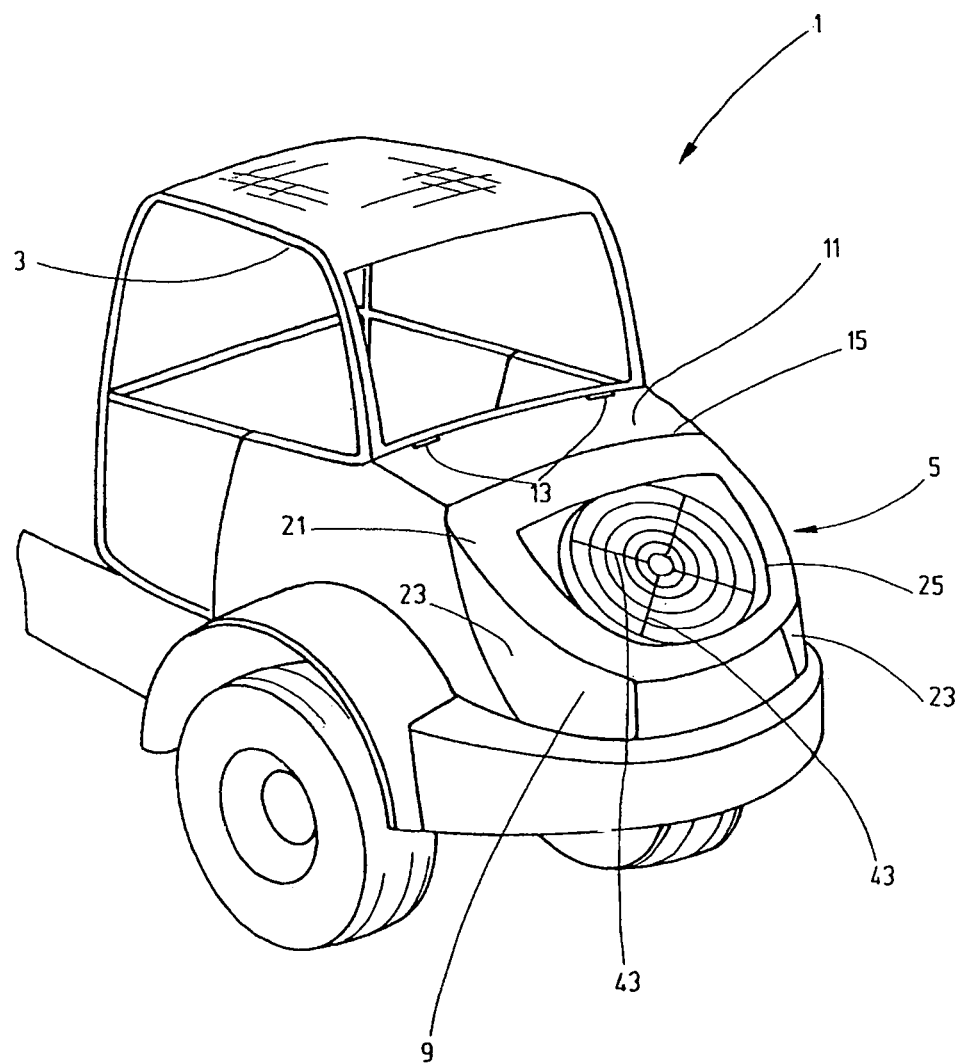
FIG. 1 is a schematic, highly simplified and detached perspective view of just the front vehicle part of a mobile working machine provided with a fluid cooling apparatus according to an exemplary embodiment of the invention.

FIG. 1 is a highly simplified drawing of just the front vehicle region of a mobile working machine 1, with the region being is connected to the cab 3 and where hydraulically operated working devices, such as the crane boom, the excavator, stacker, or the like, may be found, but are not illustrated. The section of the working machine 1 that is shown in FIG. 1 could be just as well the rear part. To supply the consumer (not illustrated) according to need, the working machine 1 has an exemplary embodiment of the fluid cooling apparatus 5 according to the invention. This fluid cooling apparatus is disposed on the respective end region of the working machine 1 and forms, with the outer wall contour 7 of the associated fluid tank 9, a component of the outer covering. In the present case, the outer covering component is an engine compartment hood 11 exposed to the surrounding area or environment outside of the working machine or vehicle. This hood can be swiveled up around the hinges 13 to provide access to the engine compartment.

Figure 2:
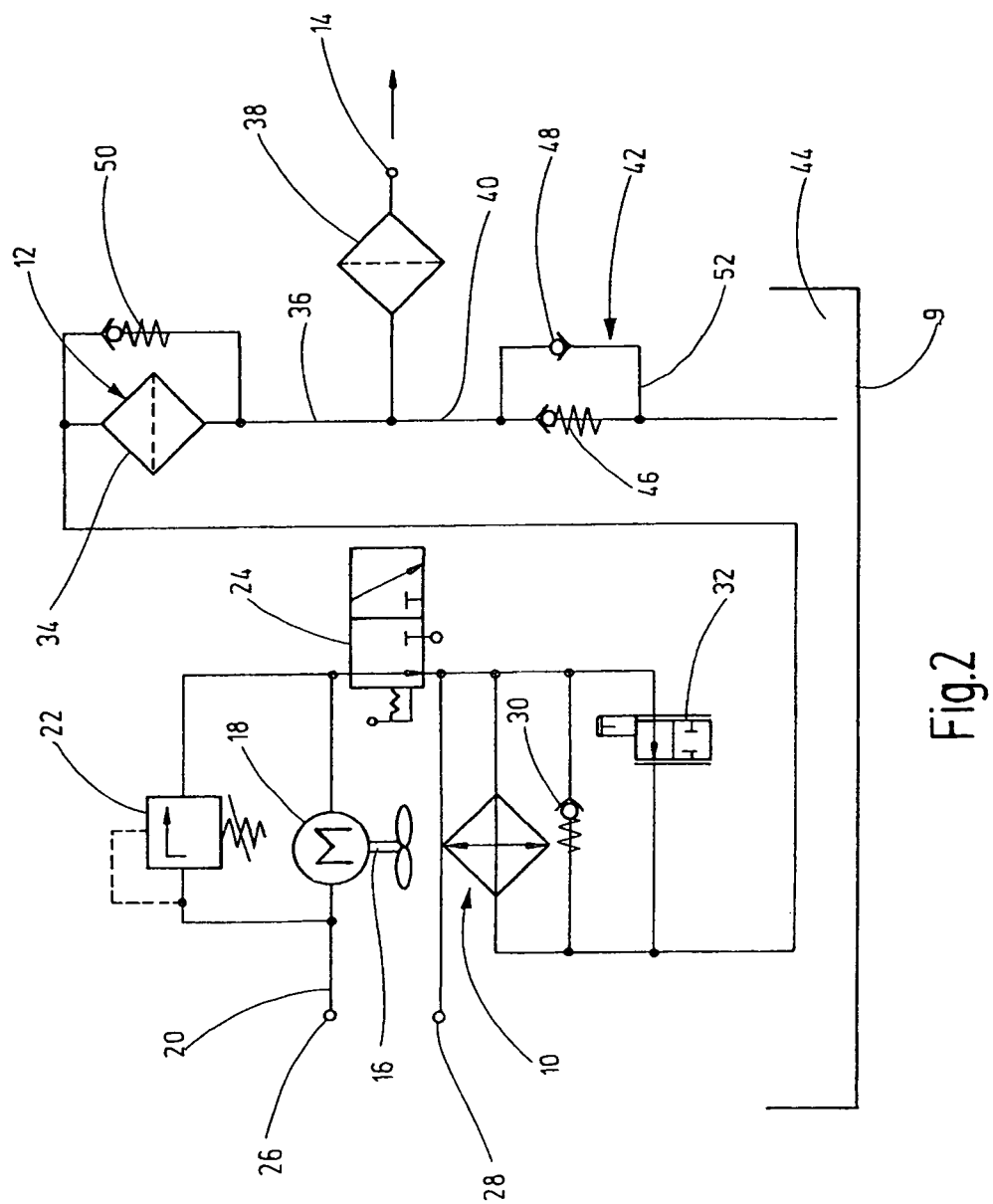
FIG. 2 is a hydraulic circuit diagram of the construction of the hydraulic system of the fluid cooling apparatus of FIG. 1.
Figure 4:
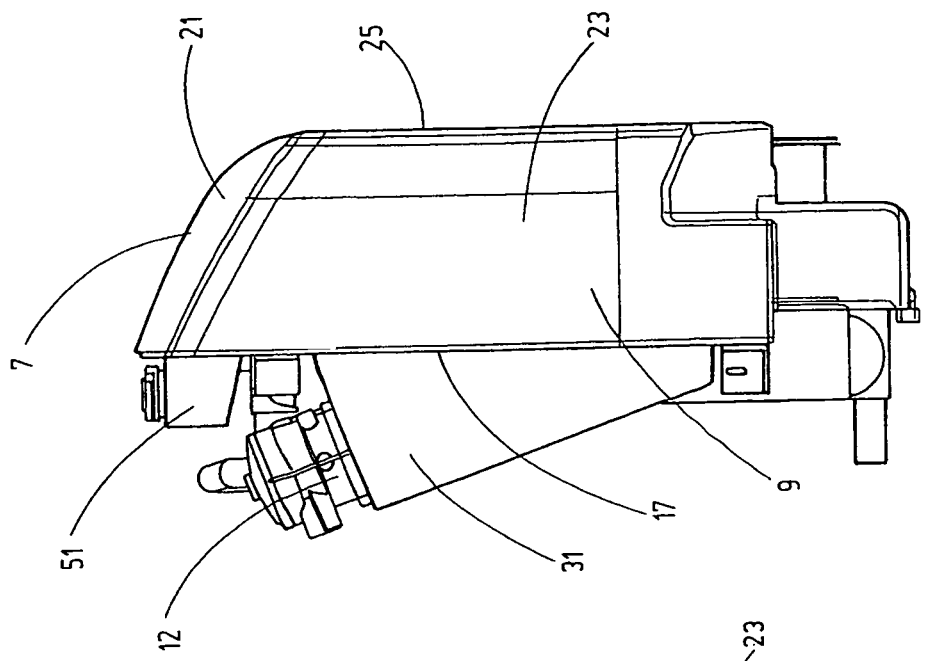
FIG. 4 is a side view of the fluid cooling apparatus of FIG. 1.

The hydraulic circuit diagram of the fluid cooling apparatus 5 shown in FIG. 2 has a heat exchanger unit 10 for cooling at least one fluid, especially in the form of hydraulic oil. The fluid cooling apparatus 5 also comprises a filter device 12 for filtering the fluid that can be passed to a consumer 14. In the present case, the consumer 14 is supposed to include a hydrostatic drive of a vehicle, in particular, in the form of a construction machine. This hydrostatic drive can be supplied in the conventional way with fluid by a feed pump (not shown in detail) or a group of feed pumps. Furthermore, the fluid cooling apparatus 5 has an air flow device 16 in the manner of an air cooling fan or a fan ventilator. The flow device is driven by a drive device 18, which in the present case includes a hydraulically operated motor. However, the hydraulic motor can also be replaced by an electric drive motor (not illustrated). Running parallel to the hydraulic motor 18, a pressure limiting valve 22, which protects the motor from overload, is connected to the hydraulic circuit 20. In the fluid flow direction, downstream of the motor, there is a manually actuatable 3/2-way switching valve 24, which in its illustrated passage position establishes the fluid circuit from the motor 18 to the heat exchanger unit 10. In the other switching position, the valve 24 shuts off the hydraulic circuit in the direction of the heat exchanger unit 10, an arrangement that offers the possibility of being able to perform maintenance work, for example, to replace the used filter elements of the filter device 12 without being hampered by the afterflow of fluid in the circuit 20.

Furthermore, as clear from FIG. 2, the input side of the hydraulic motor 18 is connected to the hydraulic circuit 20 with the consumer 14 by way of a first connecting point 26. In this context, a constant proportion of the amount of fluid is supplied directly to the motor to enable a faultless operation of the motor 18. In the secondary branch, the remaining amount of fluid, optionally with a variable volumetric amount, is conducted to the heat exchanger unit 10 in the fluid direction downstream of the switching valve 24 by way of an additional second connecting point 28. This heat exchanger unit is protected against overload by a conventional check valve 30. In an additional parallel connection to the check valve 30 and to the heat exchanger unit 10, a temperature-controlled 2/2-way proportional valve 32 is connected to the hydraulic circuit 20. As the fluid temperature rises, valve 32 switches into the blocked position to deliver in this way the heated fluid exclusively to the heat exchanger unit 10. Since the fluid to be transported is viscous, especially in the cold start phase, and, moreover, does not need to be cooled in the cold state, the load on the heat exchanger unit 10 can be reduced by suitably opening the proportional valve 32 in the direction of the passage position.

In every instance, a definable return amount flows to the filter device 12 with its first filter element 34. Then the resulting filtered and, therefore, cleaned fluid flows through the output line 36 to a second filter element 38, which is located upstream of the consumer 14 with the feed pump. In an additional secondary branch 40, the output line 36 subsequently opens into a replenishing device 42. The replenishing device 42 is oriented relative to the tank side 44 in the secondary branch 40 and has a precharge valve 46 that passes over to the tank side 44 in its open position. In the opposite direction, precharge valve 46 assumes its closed position shown in FIG. 2. That precharge valve preferably is a spring-loaded check valve. Parallel to the precharge valve 46, with the corresponding fluid linkage upstream and downstream of the precharge valve to the secondary branch 40, a replenishing valve 48 is connected to the fluid circuit 20. Replenishing valve 48 is designed as a check valve, closes toward the tank side 44 and assumes the open position in the opposite direction toward the hydraulic consumer 14. Whereas the precharge valve 46 typically has a precharge pressure of, for example, 0.5 bar, the replenishing valve 48 opens immediately, if the feed pump of the consumer 14 continues to demand storage fluid from the tank side 44, particularly when not enough fluid continues to flow in by way of the filter element 34.

The first filter element 34 in a parallel connection has a bypass valve 50 that is designed as a spring-loaded check valve, opens toward the tank side 44 and, otherwise, is set to a bypass opening pressure of, for example, 2 bar. If the filter element 34 of the filter device 12 is fouled and is thus blocked, the amount of fluid can travel to the hydraulic consumer 14 when the bypass valve 50 is opened. In such a bypass case, the filtration of the return amount to the consumer 14 is carried out by the second filter element 38.

The precharge pressure of, for example, 0.5 bar on the precharge valve 46 ensures that pressurized fluid coming from the filter device 12 is available to the hydraulic consumer 14. If the precharge pressure of the fluid return amount, which travels from the first filter element 34 into the output line 36 and the secondary branch 40, rises, the precharge valve 46 opens toward the tank side and relieves the return amount until the nominal pressure provided for the consumer 14, in the present case 0.5 bar, is reached. If too little fluid flows subsequently into the hydraulic circuit 20 by way of the first and second connecting point 26, 28, the intake side of the feed pump for the consumer 14 allows a replenishment from a tank storage amount in that the replenishing valve 48 of the replenishing device 42 opens in the direction of the consumer 14 to ensure a continued flow of the fluid medium. Hence, when the consumer 14 is operating, there is never an undersupply of consumer fluid, a feature that for safety reasons constitutes a necessity for operating hydrostatic travel drives.

Figure 3:
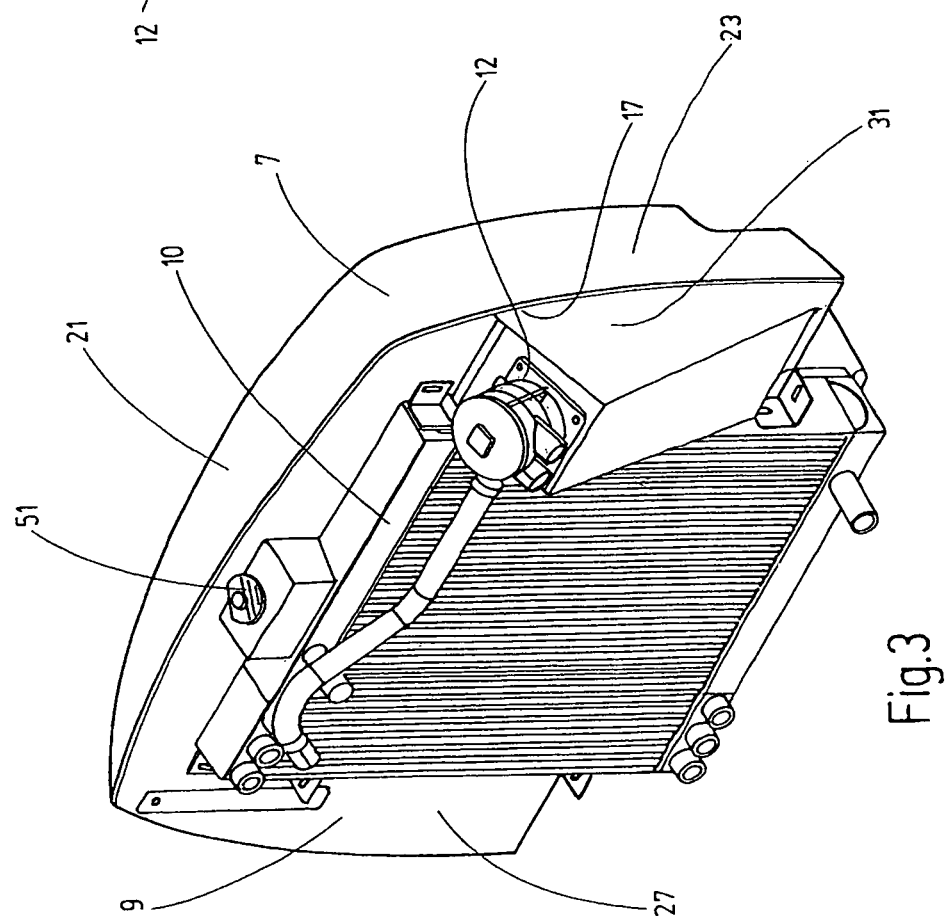
FIG. 3 is a perspective view of the fluid cooling apparatus of FIG. 1 that is removed from the working machine and viewed in the direction of the rear side of the tank housing.

FIGS. 3 to 6 show more details of the construction of the exemplary embodiment of the fluid cooling apparatus 5, which is integrated into the working machine 1 in such a way that the fluid cooling apparatus 5 forms the front or rear end of the vehicle body. FIG. 1 shows that the outer wall contour 7 of the tank 9 merges seamlessly and continuously with the hood 11 at a connecting point 15 (FIG. 1). This hood forms an additional part of the outer covering. As clear from FIGS. 3 and 4 a line-shaped gasket 17 forms a seal between the tank 9 and the adjoining hood 11 and extends along the connecting point or line 15. The tank 9 is made of an impact-resistant and weather-proof synthetic plastic material, for example, a polyamide, such as PA6, by a rotational molding process or is formed of a molded sheet metal part. Moreover, the tank is constructed such that the outer contour 7 of the tank forms the end of the vehicle body with a slightly curved top side 21 and curved sides 23, with the top side 21 and the sides 23 tapering slightly toward a front wall 25. On the rear side and adjacent to the gasket 17, the tank 9 forms a rear wall 27. The rear wall 27 has a plane surface, apart from a recess channel 31 formed on the rear wall 27 at the edge and configured for the filter device 12. Between a wide opening 29 (FIG. 6) in the front wall 25 and the rear wall 27, the tank housing forms a continuous central recess 33 (FIG. 6) forming an air flow channel between the opening 29 in the front wall 25 and a corresponding opening of the rear wall 27. FIG. 3 shows that the heat exchanger unit 10 is attached to this opening, which is not visible in the drawing, in the form of an air fin cooler.

In the region of the front wall 25, the central recess 33 of the tank housing accommodates a fan device 35 having fan blades 37 that are driven by a hydraulic motor 18 (FIG. 2). The fan device 35 is arranged in the opening 29 of the central recess 33 such that its front fan cover 39, composed of circular grill rings 41 and radially extending grill crosspieces 43, forms in the manner of a cooler grill a component of the outer covering of the vehicle front or the vehicle rear (see FIG. 1).

The tank 9, made preferably of a synthetic plastic material, such as polyamide PA6, in a rotational molding process or made as a molded sheet metal part, has a fill port 51 located in a centered manner at the top, on the rear wall 27. The interior of the tank 9 is fluidically connected directly to the receiving channel 31 containing the filter device 12, so that a direct fluid connection with the replenishing line 52 (FIG. 2) is formed. In this case, the replenishing valve 48 is connected to this replenishing line so that an outer pipeline is not necessary. As stated above, the invention, in which the outer wall contour 7 of the tank is a component of the covering, does not require a partition inside the engine covering, because the tank 9 itself fulfills the function of the partition preventing the intake of its own heated air. Therefore, there is no risk that a failure of the seals between any partition and the covering parts could result in a subsequent intake of heated air. Moreover, such a risk could not exist in the device according to the invention, even if the gasket 17 were to fail at the connecting point 15 with the hood, because in this case an inlet gap, which is optionally formed, if desired, at the connecting point 15, would only lead to an air inlet from the surrounding area and, thus, would not adversely affect the cooler performance. Therefore, the gasket 17 is required only to protect against splash water, rain, or dirt. An additional advantage of the invention lies in the fact that it makes a contribution to the reduction of noise, because the fan device 35 is surrounded by the tank 9 with the fluid located in the tank, a feature that overall leads to noise suppression.

Instead of a central filling option for the fluid tank 9, tank filling on the edge or in any other position is also possible. The outer shape of the tank can be adapted to the contour of the engine covering and can also have a shape according to the drawing in FIG. 1. When viewed in the direction of FIG. 2, uncooled oil from the working hydraulics can be filtered by a connecting line, not shown in detail, above the filter 12. The fan device 35 can be mounted, on the one hand, on the cooler 10 and, on the other hand, directly on the tank 9, preferably on the side 27 facing the cooler.

While one embodiment has been chosen to illustrate the invention, it will be understood by those skilled in the art that various changes and modifications can be made therein without departing from the scope of the invention as defined in the claims.

The invention claimed is:

1. A fluid cooling apparatus, comprising:
at least one heat exchanger unit cooling a fluid passing through the heat exchanger unit and heated or used during operation of a mobile working machine, said heat exchanger unit being mounted in an outer engine covering extending over at least one of an engine, motor or chassis part;
a tank containing the fluid and having a predetermined outer wall contour, all of said outer wall contour being a component of and integrated into said outer engine covering with an entirety of said heat exchanger unit being mounted within the outer engine covering, at least some portions of said outer wall contour having outer surfaces that are situated on the exterior of the mobile working machine and face away from an inside of the mobile working machine toward a surrounding area thereof, outside of said outer wall contour and outside of the mobile working machine, the outer wall contour merges with said outer engine covering along a connecting line, said connecting line producing a continuous transition between said outer wall contour of said tank and the outer engine covering, wherein one portion of the outer engine covering includes a movable hood, said tank including a housing made of at least one of an impact-resistant and weather-resistant synthetic plastic material or a molded sheet metal part;
a continuous central recess extending through an inside of the housing of said tank; and
fan blades of a fan device are driven inside said central recess by a dedicated motor, said fan device being on an outer face side of said tank facing away from an inside of the mobile working machine and facing a surrounding area that is outside of said outer wall contour and outside of the mobile working machine, said heat exchanger unit including an air fin cooler connected to said housing of said tank on a side opposite said fan device and in the inside of the mobile working machine.

2. A fluid cooling apparatus according to claim 1 wherein said tank comprises an integrated receiving channel receiving a filter unit in a peripheral region of said housing of said tank.

3. A fluid cooling apparatus according to claim 1 wherein said fan device is integrated and mounted with a fan cover thereof into said outer engine covering as a component of said outer engine covering.

4. A fluid cooling device according to claim 1 wherein said air fin cooler is an integrated component of said housing.

5. A fluid cooling device according to claim 2 wherein said filter unit comprises a precharge valve, a replenishing valve and a bypass valve.

6. A vehicle comprising:

an engine compartment;

an outer engine covering extending over said engine compartment and exposed to a surrounding environment outside the vehicle;

a heat exchanger for cooling fluid passing through said heat exchanger and heated or used in said engine compartment during vehicle operation, said heat exchanger being mounted in said outer engine covering; and a tank containing the fluid and having an outer wall contour with all of said outer wall contour being a component of and integrated into said outer engine covering with an entirety of said heat exchanger being outside said engine compartment, at least some portions of said outer wall contour having outer surfaces that are situated on the exterior of the mobile working machine and face away from an inside of said engine compartment toward a surrounding area thereof, outside said outer wall contour and outside of said engine compartment, the outer wall contour merges with said outer engine covering along a connecting line, said connecting line producing a continuous transition between said outer wall contour of said tank and the outer engine covering, wherein one portion of the outer engine covering includes a movable hood, said tank including a housing made of at least one of an impact-resistant and weather-resistant synthetic plastic material or a molded sheet metal part;

a continuous central recess extending through an inside of the housing of said tank; and fan blades of a fan device are driven inside said central recess by a dedicated motor, said fan device being on an outer face side of said tank facing away from an inside of said engine compartment and facing the surrounding environment outside of said outer wall contour and said engine compartment, said heat exchanger including an air fin cooler connected to said housing of said tank on a side opposite said fan device and in the inside of said engine compartment.

7. A vehicle according to claim 6 wherein said tank comprises an integrated receiving channel receiving a filter unit in a peripheral region of said housing of said tank.

8. A vehicle according to claim 6 wherein said fan device is integrated and mounted with a fan cover thereof into said outer engine covering as a component of said outer engine covering.

* * * * *